US008839263B2

(12) United States Patent
Sugai

(10) Patent No.: US 8,839,263 B2
(45) Date of Patent: Sep. 16, 2014

(54) APPARATUS TO MANAGE VIRTUAL MACHINE MIGRATION TO A BEST FIT SERVER BASED ON RESERVE CAPACITY

(75) Inventor: Koji Sugai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 180 days.

(21) Appl. No.: 13/036,840

(22) Filed: Feb. 28, 2011

(65) Prior Publication Data

US 2011/0239215 A1    Sep. 29, 2011

(30) Foreign Application Priority Data

Mar. 24, 2010   (JP) ................................ 2010-067466

(51) Int. Cl.
*G06F 9/455*   (2006.01)
*G06F 9/46*   (2006.01)
*G06F 9/50*   (2006.01)

(52) U.S. Cl.
CPC .......... *G06F 9/5088* (2013.01); *G06F 9/45558* (2013.01); *G06F 2009/4557* (2013.01)
USPC .......................................... 718/105; 718/104

(58) Field of Classification Search
None
See application file for complete search history.

(56) References Cited

U.S. PATENT DOCUMENTS

| | | | | |
|---|---|---|---|---|
| 8,291,411 | B2 * | 10/2012 | Beaty et al. ....................... | 718/1 |
| 2002/0087611 | A1 | 7/2002 | Tanaka et al. | |
| 2007/0271560 | A1 * | 11/2007 | Wahlert et al. .................... | 718/1 |
| 2008/0034370 | A1 * | 2/2008 | Huizenga ........................ | 718/104 |
| 2008/0189700 | A1 * | 8/2008 | Schmidt et al. .................... | 718/1 |
| 2008/0282253 | A1 * | 11/2008 | Huizenga ........................ | 718/104 |
| 2008/0295096 | A1 * | 11/2008 | Beaty et al. ........................ | 718/1 |
| 2009/0235265 | A1 * | 9/2009 | Dawson et al. ................ | 718/104 |
| 2009/0307597 | A1 * | 12/2009 | Bakman ........................ | 715/736 |
| 2010/0242045 | A1 * | 9/2010 | Swamy et al. ................ | 718/104 |
| 2010/0306382 | A1 * | 12/2010 | Cardosa et al. ................ | 709/226 |
| 2011/0185064 | A1 * | 7/2011 | Head et al. ..................... | 709/226 |
| 2011/0214005 | A1 * | 9/2011 | Biran et al. ....................... | 714/1 |

FOREIGN PATENT DOCUMENTS

JP    2002-202959    7/2002

OTHER PUBLICATIONS

Patent Abstracts of Japan, Publication No. 2002-202959, Published Jul. 19, 2002.

* cited by examiner

*Primary Examiner* — Meng An
*Assistant Examiner* — Bradley Teets
(74) *Attorney, Agent, or Firm* — Staas & Halsey LLP

(57) ABSTRACT

An arrangement control unit of a management server connected to servers on which VMs operate collects information indicating a physical resource capacity used by each VM in the servers; calculates a reserve capacity that is a physical resource capacity expected to be further required for each VM to operate according to the physical resource capacity currently used by each VM; and selects any of VMs as a target VM to be migrated, and select as a destination server, a server having a free physical resource capacity which can accommodate the physical resource capacity used by the target VM to be migrated and the reserve capacity necessary therefor among the servers; and a VM control unit of the management server migrates the target VM to be migrated to the destination server.

14 Claims, 19 Drawing Sheets

FIG.2

| REQUIRED RESOURCE CAPACITY PARAMETER (α) | ACTIVITY RATIO LOWER LIMIT VALUE (s) |
|---|---|
| 0.2 | 0.5 |

| SERVER NAME | POWER STATE | CPU PERFORMANCE | TOTAL USED CPU CAPACITY | FREE CPU CAPACITY | TOTAL RESERVE CPU CAPACITY | TOTAL REQUIRED CPU CAPACITY (xc) | AVERAGE RESERVE CPU CAPACITY | MEMORY SIZE | TOTAL USED MEMORY CAPACITY | FREE MEMORY CAPACITY | TOTAL RESERVE MEMORY CAPACITY | TOTAL REQUIRED MEMORY CAPACITY (xm) | AVERAGE RESERVE MEMORY CAPACITY |
|---|---|---|---|---|---|---|---|---|---|---|---|---|---|
| | − | GHz | GHz | GHz | GHz | GHz | GHz | GB | GB | GB | GB | GB | GB |
| SERVER 1 | on | 2.0 | 0.2 | 1.8 | 1.8 | 0.6 | 1.8 | 4.0 | 0.2 | 3.8 | 0.8 | 0.4 | 0.8 |
| SERVER 2 | on | 3.0 | 2.8 | 0.2 | 0.2 | 2.8 | 0.2 | 8.0 | 1.5 | 6.5 | 0.5 | 1.6 | 0.5 |
| SERVER 3 | on | 4.0 | 1.3 | 2.7 | 3.7 | 2.0 | 1.2 | 4.0 | 1.3 | 2.7 | 4.7 | 2.2 | 1.6 |
| SERVER 4 | on | 3.0 | 2.7 | 0.3 | 2.3 | 3.2 | 1.2 | 8.0 | 2.5 | 5.5 | 3.5 | 3.2 | 1.8 |

| VM NAME | OPERATING SERVER | ALLOCATED CPU CAPACITY (GHz) | USED CPU CAPACITY (GHz) | RESERVE CPU CAPACITY (GHz) | REQUIRED CPU CAPACITY (GHz) | ALLOCATED MEMORY CAPACITY (GB) | USED MEMORY CAPACITY (GB) | RESERVE MEMORY CAPACITY (GB) | REQUIRED MEMORY CAPACITY (GB) |
|---|---|---|---|---|---|---|---|---|---|
| VM1 | SERVER 1 | 2.0 | 0.2 | 1.8 | 0.6 | 1.0 | 0.2 | 0.8 | 0.4 |
| VM2 | SERVER 2 | 3.0 | 2.8 | 0.2 | 2.8 | 2.0 | 1.5 | 0.5 | 1.6 |
| VM3 | SERVER 3 | 1.0 | 0.1 | 0.9 | 0.3 | 2.0 | 0.4 | 1.6 | 0.7 |
| VM4 | SERVER 3 | 2.0 | 0.8 | 1.2 | 1.0 | 2.0 | 0.5 | 1.5 | 0.8 |
| VM5 | SERVER 3 | 2.0 | 0.4 | 1.6 | 0.7 | 2.0 | 0.4 | 1.6 | 0.7 |
| VM6 | SERVER 4 | 2.0 | 0.2 | 1.8 | 0.6 | 4.0 | 0.7 | 3.3 | 1.4 |
| VM7 | SERVER 4 | 3.0 | 2.5 | 0.5 | 2.6 | 2.0 | 1.8 | 0.2 | 1.8 |

| VM NAME | OPERATING SERVER | ALLOCATED CPU CAPACITY (GHz) | USED CPU CAPACITY (GHz) | RESERVE CPU CAPACITY (GHz) | REQUIRED CPU CAPACITY (GHz) | ALLOCATED MEMORY CAPACITY (GB) | USED MEMORY CAPACITY (GB) | RESERVE MEMORY CAPACITY (GB) | REQUIRED MEMORY CAPACITY (GB) |
|---|---|---|---|---|---|---|---|---|---|
| VM1 | SERVER 3 | 2.0 | 0.2 | 1.8 | 0.6 | 1.0 | 0.2 | 0.8 | 0.4 |
| VM2 | SERVER 2 | 3.0 | 2.8 | 0.2 | 2.8 | 2.0 | 1.5 | 0.5 | 1.6 |
| VM3 | SERVER 3 | 1.0 | 0.1 | 0.9 | 0.3 | 2.0 | 0.4 | 1.6 | 0.7 |
| VM4 | SERVER 3 | 2.0 | 0.8 | 1.2 | 1.0 | 2.0 | 0.5 | 1.5 | 0.8 |
| VM5 | SERVER 3 | 2.0 | 0.4 | 1.6 | 0.7 | 2.0 | 0.4 | 1.6 | 0.7 |
| VM6 | SERVER 4 | 2.0 | 0.2 | 1.8 | 0.6 | 4.0 | 0.7 | 3.3 | 1.4 |
| VM7 | SERVER 4 | 3.0 | 2.5 | 0.5 | 2.6 | 2.0 | 1.8 | 0.2 | 1.8 |

| SERVER NAME | POWER STATE | CPU PERFORMANCE (GHz) | TOTAL USED CPU CAPACITY (GHz) | FREE CPU CAPACITY (GHz) | TOTAL RESERVE CPU CAPACITY (GHz) | TOTAL REQUIRED CPU CAPACITY (xc) (GHz) | AVERAGE RESERVE CPU CAPACITY (GHz) | MEMORY SIZE (GB) | TOTAL USED MEMORY CAPACITY (GB) | FREE MEMORY CAPACITY (GB) | TOTAL RESERVE MEMORY CAPACITY (GB) | TOTAL REQUIRED MEMORY CAPACITY (xm) (GB) | AVERAGE RESERVE MEMORY CAPACITY (GB) |
|---|---|---|---|---|---|---|---|---|---|---|---|---|---|
| SERVER 1 | off | 2.0 | 0.0 | 2.0 | — | — | — | 4.0 | 0.0 | 4.0 | — | — | — |
| SERVER 2 | on | 3.0 | 2.8 | 0.2 | 0.2 | 2.8 | 0.2 | 8.0 | 1.5 | 6.5 | 0.5 | 1.6 | 0.5 |
| SERVER 3 | on | 4.0 | 1.5 | 2.5 | 5.5 | 2.6 | 1.4 | 4.0 | 1.5 | 2.5 | 5.5 | 2.6 | 1.4 |
| SERVER 4 | on | 3.0 | 2.7 | 0.3 | 2.3 | 3.2 | 1.2 | 8.0 | 2.5 | 5.5 | 3.5 | 3.2 | 1.8 |

| VM NAME | OPERATING SERVER | ALLOCATED CPU CAPACITY | | USED CPU CAPACITY | | RESERVE CPU CAPACITY | | REQUIRED CPU CAPACITY | | ALLOCATED MEMORY CAPACITY | | USED MEMORY CAPACITY | | RESERVE MEMORY CAPACITY | | REQUIRED MEMORY CAPACITY | |
|---|---|---|---|---|---|---|---|---|---|---|---|---|---|---|---|---|---|
| | | GHz | | GHz | | GHz | | GHz | | GB | | GB | | GB | | GB | |
| VM1 | — | 2.0 | | 0.2 | | 1.8 | | 0.6 | | 1.0 | | 0.2 | | 0.8 | | 0.4 | |
| VM2 | SERVER 3 | 3.0 | | 2.8 | | 0.2 | | 2.8 | | 2.0 | | 1.5 | | 0.5 | | 1.6 | |
| VM3 | SERVER 2 | 1.0 | | 0.1 | | 0.9 | | 0.3 | | 2.0 | | 0.4 | | 1.6 | | 0.7 | |
| VM4 | SERVER 3 | 2.0 | | 0.8 | | 1.2 | | 1.0 | | 2.0 | | 0.5 | | 1.5 | | 0.8 | |
| VM5 | SERVER 3 | 2.0 | | 0.4 | | 1.6 | | 0.7 | | 2.0 | | 0.4 | | 1.6 | | 0.7 | |
| VM6 | SERVER 3 | 2.0 | | 0.2 | | 1.8 | | 0.6 | | 4.0 | | 0.7 | | 3.3 | | 1.4 | |
| VM7 | SERVER 4 | 3.0 | | 2.5 | | 0.5 | | 2.6 | | 2.0 | | 1.8 | | 0.2 | | 1.8 | |

| VM NAME | MAXIMUM USED CPU CAPACITY | | | | | | MAXIMUM USED MEMORY CAPACITY | | | | | |
|---|---|---|---|---|---|---|---|---|---|---|---|---|
| | TODAY | ONE DAY BEFORE | ... | 30 DAYS BEFORE | MAX. | | TODAY | ONE DAY BEFORE | ... | 30 DAYS BEFORE | MAX. | |
| | GHz | GHz | ... | GHz | GHz | | GB | GB | ... | GB | GB | |
| VM1 | 1.9 | 2.0 | ... | 0.2 | 2.0 | | 0.2 | 0.5 | ... | 0.8 | 0.8 | |
| VM2 | 2.8 | 0.2 | ... | 2.5 | 2.8 | | 1.5 | 0.1 | ... | 2.0 | 2.0 | |
| VM3 | 0.3 | 0.1 | ... | 0.1 | 0.3 | | 0.4 | 0.3 | ... | 0.2 | 0.5 | |
| VM4 | 1.0 | 0.5 | ... | 0.8 | 1.2 | | 0.5 | 0.5 | ... | 0.1 | 0.6 | |
| VM5 | 0.8 | 0.4 | ... | 0.4 | 0.8 | | 0.4 | 0.4 | ... | 0.1 | 0.6 | |
| VM6 | 1.5 | 1.0 | ... | 0.7 | 1.6 | | 0.7 | 1.3 | ... | 0.7 | 1.3 | |
| VM7 | 2.5 | 2.0 | ... | 1.8 | 2.5 | | 1.8 | 1.9 | ... | 1.7 | 2.0 | |

| VM NAME | OPERATING SERVER | ALLOCATED CPU CAPACITY GHz | USED CPU CAPACITY GHz | RESERVE CPU CAPACITY GHz | REQUIRED CPU CAPACITY GHz | ALLOCATED MEMORY CAPACITY GB | USED MEMORY CAPACITY GB | RESERVE MEMORY CAPACITY GB | REQUIRED MEMORY CAPACITY GB |
|---|---|---|---|---|---|---|---|---|---|
| VM1 | — | 2.0 | 0.2 | 1.8 | 0.6 | 1.0 | 0.2 | 0.6 | 0.3 |
| VM2 | SERVER 1 | 3.0 | 2.8 | 0.0 | 2.8 | 2.0 | 1.5 | 0.5 | 1.6 |
| VM3 | SERVER 2 | 1.0 | 0.1 | 0.2 | 0.1 | 2.0 | 0.4 | 0.1 | 0.4 |
| VM4 | SERVER 3 | 2.0 | 0.8 | 0.4 | 0.9 | 2.0 | 0.5 | 0.1 | 0.5 |
| VM5 | SERVER 3 | 2.0 | 0.4 | 0.4 | 0.5 | 2.0 | 0.4 | 0.2 | 0.4 |
| VM6 | SERVER 4 | 2.0 | 0.2 | 1.4 | 0.5 | 4.0 | 0.7 | 0.6 | 0.8 |
| VM7 | SERVER 4 | 3.0 | 2.5 | 0.0 | 2.5 | 2.0 | 1.8 | 0.2 | 1.8 |

| SERVER NAME | POWER STATE | CPU PERFORMANCE GHz | TOTAL USED CPU CAPACITY GHz | FREE CPU CAPACITY GHz | TOTAL RESERVE CPU CAPACITY GHz | TOTAL REQUIRED CPU CAPACITY (xc) GHz | AVERAGE RESERVE CPU CAPACITY GHz | MEMORY SIZE GB | TOTAL USED MEMORY CAPACITY GB | FREE MEMORY CAPACITY GB | TOTAL RESERVE MEMORY CAPACITY GB | TOTAL REQUIRED MEMORY CAPACITY (xm) GB | AVERAGE RESERVE MEMORY CAPACITY GB |
|---|---|---|---|---|---|---|---|---|---|---|---|---|---|
| SERVER 1 | on | 2.0 | 0.2 | 1.8 | 1.8 | 0.6 | 1.8 | 4.0 | 0.2 | 3.8 | 0.6 | 0.3 | 0.6 |
| SERVER 2 | on | 3.0 | 2.8 | 0.2 | 0.0 | 2.8 | 0.0 | 8.0 | 1.5 | 6.5 | 0.5 | 1.6 | 0.5 |
| SERVER 3 | on | 4.0 | 1.3 | 2.7 | 1.0 | 1.5 | 0.3 | 4.0 | 1.3 | 2.7 | 0.4 | 1.4 | 0.1 |
| SERVER 4 | on | 3.0 | 2.7 | 0.3 | 1.4 | 3.0 | 0.7 | 8.0 | 2.5 | 5.5 | 0.8 | 2.7 | 0.4 |

14B

APPARATUS TO MANAGE VIRTUAL MACHINE MIGRATION TO A BEST FIT SERVER BASED ON RESERVE CAPACITY

CROSS-REFERENCE TO RELATED APPLICATION

This application is based upon and claims the benefit of priority of the prior Japanese Patent Application No. 2010-067466, filed on Mar. 24, 2010, the entire contents of which are incorporated herein by reference.

FIELD

The present embodiments discussed herein are related to a technique for using a virtual machine for information processing.

BACKGROUND

Recently, a service of operating a virtual machine (VM) on a server and offering it to a user is delivered in a system configuration which applies cloud computing or thin clients. On such a server, one or more VMs operate, and a physical resource (for example, a central processing unit (CPU), a memory, etc.) that is virtualized by software is allocated to each VM. As a method for respectively allocating a physical resource to VMs which operate on a single server, there has been proposed a technique to dynamically allocate a physical resource to the respective VMs which operate on a single server according a state in which the physical resource of the server is used by the respective VMs.

On the other hand, for a system configuration in which two or more servers are present, the following technique is adopted so that VMs can normally operate on each server. That is, the technique is a VM arrangement method, in which a permitted available range of each server is set by determining an upper limit and a lower limit of a ratio of a physical resource capacity used by VMs in each single server with respect to a total physical resource capacity of the server, and the VMs are arranged so that the ratio above falls within the permitted available range. Specifically, if a ratio of a physical resource capacity used by the VMs of any single server with respect to a total physical resource capacity of the server is greater that an upper limit of the permitted available range, one or more VMs are migrated to another server. As a result, even when a load imposed by a VM sharply increases, processing performance degradation of the VM due to shortage of the physical resource can be prevented (see, for example, Japanese Laid-open Patent Publication No. 2002-202959).

With the aforementioned technique, however, VMs may not be efficiently consolidated.

SUMMARY

As a suggestion, a computer, which can communicate with two or more servers on each of which a virtual machine is operated, perform the following operations. That is, the computer collects information, from which a physical resource capacity currently used by each virtual machine running on the respective servers can be specified. Then, based on the physical resource capacity currently used by each virtual machine, which physical resource capacity is specified from the collected information, the computer calculates a reserve capacity that is a physical resource capacity prospected to be further required for each virtual machine to operate, for each virtual machine. Then, the computer selects at least one of the virtual machines which operate on each of the two or more servers as a target virtual machine to be migrated, and selects a destination server to which the target virtual machine to be migrated is migrated among the two or more servers so that a difference between a reserve capacity for a virtual machine running on the destination server and a reserve capacity for the target virtual machine to be migrated is less than a difference between a reserve capacity for a virtual machine running on another server and the reserve capacity of the target virtual machine to be migrated. After that, the computer migrates the target virtual machine to be migrated to the destination server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is an explanatory view of one example of a setting parameter of a VM management DB;

FIG. 3 is an explanatory view of one example of a server table of a VM management DB;

FIG. 4 is an explanatory view of one example of a VM table of a VM management DB;

FIG. 11 is an explanatory view illustrating one example of a VM table in a specific example of the first embodiment;

FIG. 12 is an explanatory view illustrating one example of a server table in a specific example of the first embodiment;

FIG. 13 is an explanatory view of a VM table illustrating one example of a VM table in a specific example of the first embodiment;

FIG. 16 is an explanatory view of one example of a VM table of a VM history DB;

FIG. 20 is an explanatory view illustrating one example of a VM table in a specific example of the second embodiment; and FIG. 21 is an explanatory view illustrating one example of a server table in a specific example of the second embodiment.

DESCRIPTION OF EMBODIMENTS

Figure 1:
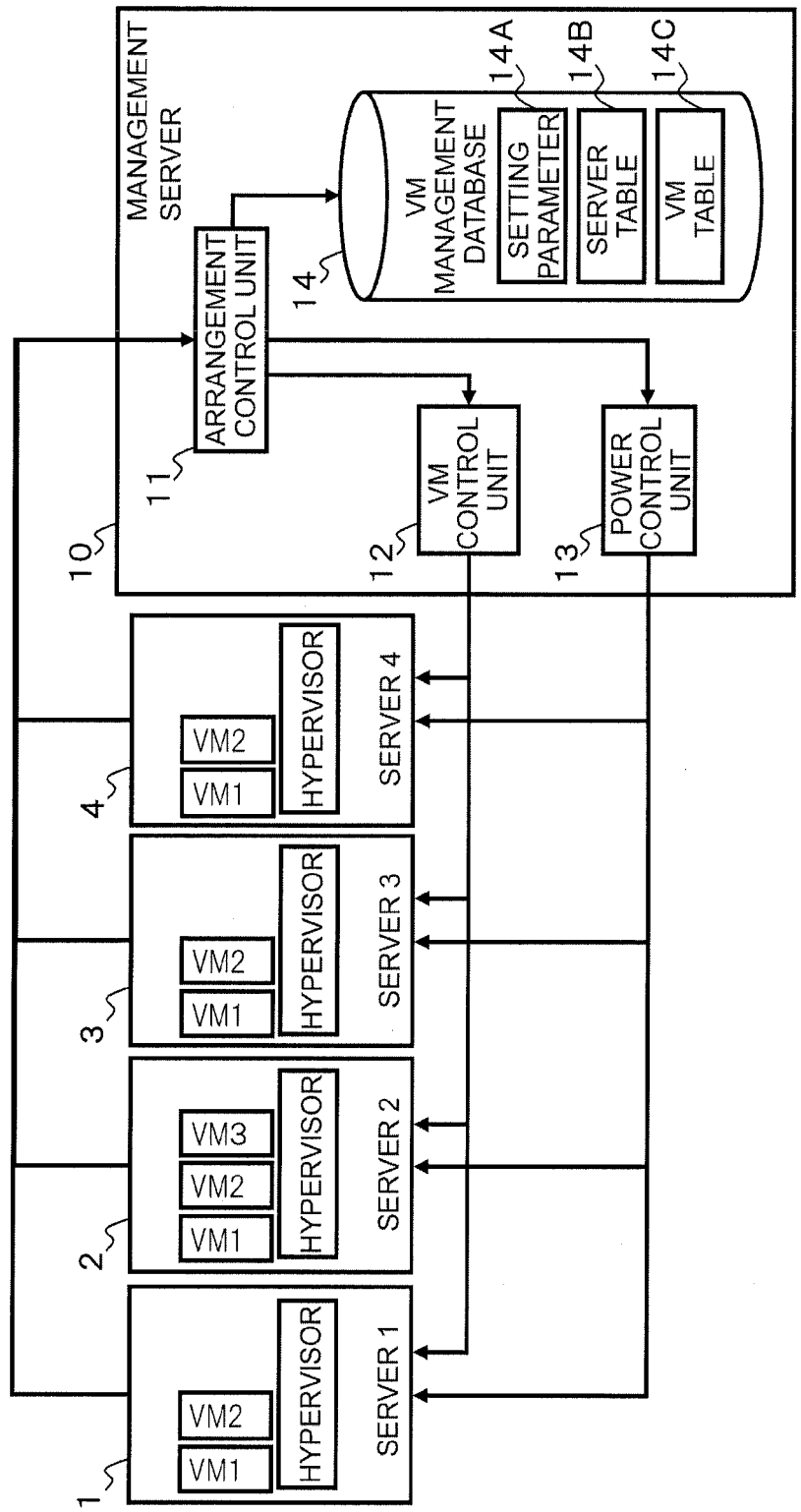
FIG. 1 is a configuration view of one example (first embodiment) of a VM management system.

Hereinafter, preferred embodiments of the present technique will be explained in detail with reference to the accompanying drawings.

First Embodiment

According to one embodiment, a computer, which can communicate with two or more servers, performs the following operations. That is, the computer collects information, from which a physical resource capacity currently used by each of virtual machines running on the respective servers can be specified. Then, based on the physical resource capacity currently used by each virtual machine, which physical resource capacity is specified from the collected information, the computer calculates a reserve capacity, i.e., a physical resource capacity prospected to be further required for each virtual machine to operate, for each virtual machine.

Then, the computer selects at least one of the virtual machines which operate on each of the two or more servers as a target virtual machine to be migrated (S), and selects a destination server to which the target virtual machine to be migrated (S) is migrated among the two or more servers so that a difference between a reserve capacity for a virtual machine running on the destination server (D) and a reserve capacity for the target virtual machine to be migrated (S) is less than a difference between a reserve capacity for a virtual machine running on another server (O) and the reserve capacity of the target virtual machine to be migrated (S). After that, the computer migrates the target virtual machine to be migrated (S) to the selected server.

As described above, when migrating a virtual machine, a server, in which a virtual machine provided with a reserve capacity close to (preferably, closest to) a reserve capacity for the target virtual machine to be migrated is running, is selected as a candidate destination server. Then, the target virtual machine is migrated to the destination server. Accordingly, the virtual machines respectively provided with reserve capacities close to each other can be consolidated.

In this manner, two or more virtual machines, which respectively require reserve capacities close to each other, can be consolidated in a single server. Thus, this server can generally accommodate increase of throughput, by reserving a resource capacity as much as a reserve capacity that each of these virtual machines require for future throughput variation.

By arranging so that virtual machines which require about the same reserve capacity operate on a single server, free physical resource capacity that the server must reserve can be made to be the minimum necessary, so that the number of servers for operating virtual machines can be more efficiently reduced.

Assuming that the reserve capacity of each of m virtual machines consolidated in a single server being R1 to Rm, the resource capacity to be reserved for accommodating future throughput variation may be max(R1, . . . , Rm).

Furthermore, the number of virtual machines may be two or more. A server on which a virtual machine that requires a reserve capacity closest to that of a target virtual machine to be migrated among the two or more virtual machines is operated, may be used as a destination server.

FIG. 1 is a configuration view of one example of a VM management system. This VM management system includes servers 1 to 4, and a management server 10 that is connected to each server 1 to 4 through a network. This management server 10 performs overall management of the servers 1 to 4, and remotely controls various settings and operations related to the servers 1 to 4. Each of the servers 1 to 4 and the management server 10 is a computer having at least a central processing unit (CPU) and a memory. Note that the number of the servers illustrated in FIG. 1 is only an example.

In the servers 1 to 4, an environment in which a VM can operate is built, and one or more VMs can operate on a virtual operating system running on a hypervisor.

The management server 10 has an arrangement control unit 11, a VM control unit 12, a power control unit 13, and a VM management database (hereinafter referred to as "VM management DB") 14.

The arrangement control unit 11 monitors a state in which a physical resource of each server 1 to 4 is used, and determines arrangement of VMs in the servers 1 to 4 (i.e., determines which VM is operated in which server 1 to 4). As used herein, the term "physical resource" refers to a hardware resource, for example, such as a CPU, a memory, etc.

The VM control unit 12 remotely controls the servers 1 to 4, and performs addition or migration of the VMs according to the VM arrangement determined by the arrangement control unit 11.

The power control unit 13 turns on or off the power of each server 1 to 4 as required based on the VM arrangement determined by the arrangement control unit 11.

Respective functions of the arrangement control unit 11, the VM control unit 12, and the power control unit 13 of the management server 10 are implemented by executing a VM arrangement control program by the CPU in the management server 10 so as to cooperate with hardware components such as a storage device, an input device, a port for establishing communication, etc. The VM arrangement control program may be maintained on a computer-readable non-transitory medium, such as, for example, a magnetic tape, a magnetic disk, a magnetic drum, an IC card, a CD-ROM, a DVD-ROM, etc. The VM arrangement control program recorded on such a non-transitory medium becomes executable by installing it in the management server 10.

The VM management DB 14 is constructed in the storage device of the management server 10, and at least information that is necessary for the arrangement control unit 11 to determine arrangement of VMs is stored therein. The VM management DB 14 includes a setting parameter 14A, a server table 14B, and a VM TABLE 14C.

As illustrated in FIG. 2, the setting parameter 14A includes, for example, a required resource capacity parameter, and an activity ratio lower limit value. The required resource capacity parameter (a) is a parameter used for calculating a required resource capacity that is a physical resource capacity required for a VM to operate (hereinafter, a required resource capacity for a CPU is referred to as "required CPU capacity", and a required resource capacity for a memory is referred to as "required memory capacity"). Furthermore, the activity ratio lower limit value is a value that indicates a lower limit of a permitted available range of a physical resource activity ratio in each server. The required resource capacity parameter and the activity ratio lower limit value may be arbitrarily set in advance by a system administrator.

The server table 14B is a table in which information indicating a state in which the physical resources of the servers 1 to 4 are used. FIG. 3 illustrates one example of a data structure and a data content of the server table 14B. The server table 14B contains a server name and has information regarding a server that is related to this server name as follows. That is, the server table 14B contains a power state of a server, a CPU performance (GHz) of the server, a total used CPU capacity (GHz) obtained by multiplying the CPU performance by a CPU activity ratio in the server (i.e., a value obtained by combining the used CPU capacities by all of the VMs running on the server), and a free CPU capacity (GHz) that is a value obtained by subtracting the total used CPU capacity from the CPU performance. The server table 14B further contains a total reserve CPU capacity (GHz) that is obtained by combining the reserve CPU capacities which are CPU resource capacities respectively prospected to be further required for all of the virtual machines running on the server, a total required CPU capacity (GHz) obtained by combining the required CPU capacities of all of the virtual machines running on the server, and an average reserve CPU capacity (GHz) of the VMs running on the server.

In addition, the server table 14B further contains a memory size (GB) of the server, a total used memory capacity (GB) obtained by combining the used memory capacities by all of the VMs running on the server, and a free memory capacity (GB) that is a value obtained by subtracting the total used memory capacity from the memory size. The server table 14B further contains a total reserve memory capacity (GB) that is obtained by combining the reserve memory capacities which are memory resource capacities respectively prospected to be further required for all of the virtual machine running on the server, a total required memory capacity (GB) obtained by combining the required memory capacities of all of the virtual machines running on the server, and an average reserve memory capacity (GB) of the VMs running on the server.

The VM table 14C is a table for storing information indicating a state in which a CPU is used (hereinafter referred to as "CPU use state") by each VM. As illustrated in FIG. 4, the VM table 14C contains a VM name, a server name on which the VM operates, an allocated CPU capacity (GHz) to the VM, a used CPU capacity (GHz), a reserve CPU capacity (GHz), and a required CPU capacity (GHz). Furthermore, the VM table 14C further contains an allocated memory capacity (GB) to the VM, a current used memory capacity (GB), a reserve memory capacity (GB), and a required memory capacity (GB).

In the following, processes performed by the management server 10 will be described.

Figure 5:
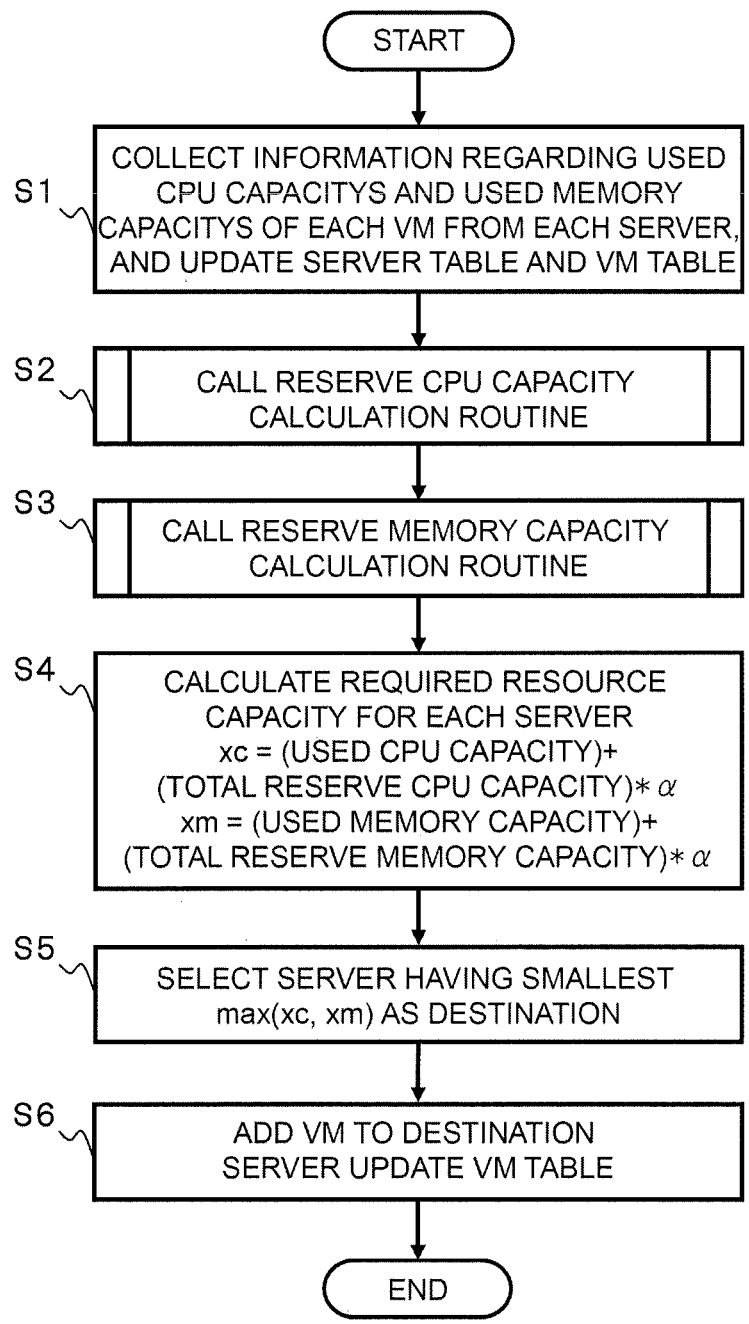
FIG. 5 is a flowchart illustrating one example of a VM new addition process.

FIG. 5 is a flowchart illustrating a VM new addition process. This process is performed when a VM is additionally required by an application program operating on the server 1 to 4 or when a VM additional requirement operation is performed by a user or a system administrator.

In step 1 (abbreviated to S1 in the drawings, the same will be applied hereunder), an arrangement control unit 11 collects information, from which a used CPU capacity and a used memory capacity by a VM operating on each server can be specified, from servers 1 to 4. Note that the information from which a used CPU capacity and a used memory capacity can be specified may be, for example, a used capacity itself or an activity ratio. If the information is an activity ratio, the arrangement control unit 11 calculates used capacities by multiplying the activation ratio by a CPU performance and a memory size of the server. Then, based on the collected information, the arrangement control unit 11 updates a server table 14B regarding a total used CPU capacity and a total used memory capacity for each server, and updates VM table 14 C regarding a used CPU capacity and a used memory capacity for each VM. Furthermore, based on the total used CPU capacity for each server and the CPU performance of each server, the arrangement control unit 11 calculates a free CPU capacity for each server, and updates the server table 14B. Furthermore, based on the total used memory capacity for each server and the memory size of each server, the arrangement control unit 11 calculates a free memory capacity for each server by subtracting the used memory capacity from the memory size of the server, and updates the server table 14B. The CPU performance and the memory size of each server may be obtained from each server during this process, or may be stored in advance in the server table 14B.

In step 2, the arrangement control unit 11 calls a subroutine for calculating a reserve CPU capacity.

In step 3, the arrangement control unit 11 calls a subroutine for calculating a reserve memory capacity.

In step 4, the arrangement control unit 11 calculates a total required CPU capacity and a total required memory capacity for each server based on the used physical resource capacity contained in the server table 14B. The total required CPU capacity and the total required memory capacity for each server are calculated, for example, according to the following equations.

$$\text{Total Required CPU Capacity}=(\text{Total Used CPU Capacity})+(\text{Total Reserve CPU Capacity})*\alpha$$

$$\text{Total Required Memory Capacity}=(\text{Total Used Memory Capacity})+(\text{Total Reserve Memory Capacity})*\alpha$$

In the equations above, "$\alpha$" is a required resource capacity parameter that is set to the parameter 14A of the VM management DB 14. If "$\alpha$" is set to 1, a value obtained by combining the used physical resource capacities and the reserve physical resource capacities of all of the VMs running on a single server is equals to a required resource capacity of the server. Furthermore, the ratio of the reserve capacity to be included in the required resource capacity can be adjusted by adjusting the "$\alpha$" value.

In step 5, taking into consideration both a total required CPU capacity and a total required memory capacity of each server, the arrangement control unit 11 selects a server for which the smallest required resource capacity is required by a VM therein, as a destination server on which the VM is arranged. As a selection method described above, the arrangement control unit 11 selects, for example, selects a server having a value calculated by the following formula is smallest.

$$\max(\text{Total Required CPU Capacity}, \text{Total Required Memory Capacity})$$

In other words, the calculated value by the following formula is a larger one between the total required CPU capacity and the total required memory capacity.

In step 6, the VM control unit 12 adds the VM to the server selected as a destination server on which the VM is arranged. Furthermore, the arrangement control unit 11 adds information regarding the VM that is arranged in step 5 to the VM table 14C of the VM management DB 14. At this time, at least the information indicating the name of the server on which the VM is arranged is to be stored in the VM table 14C.

Figure 6:
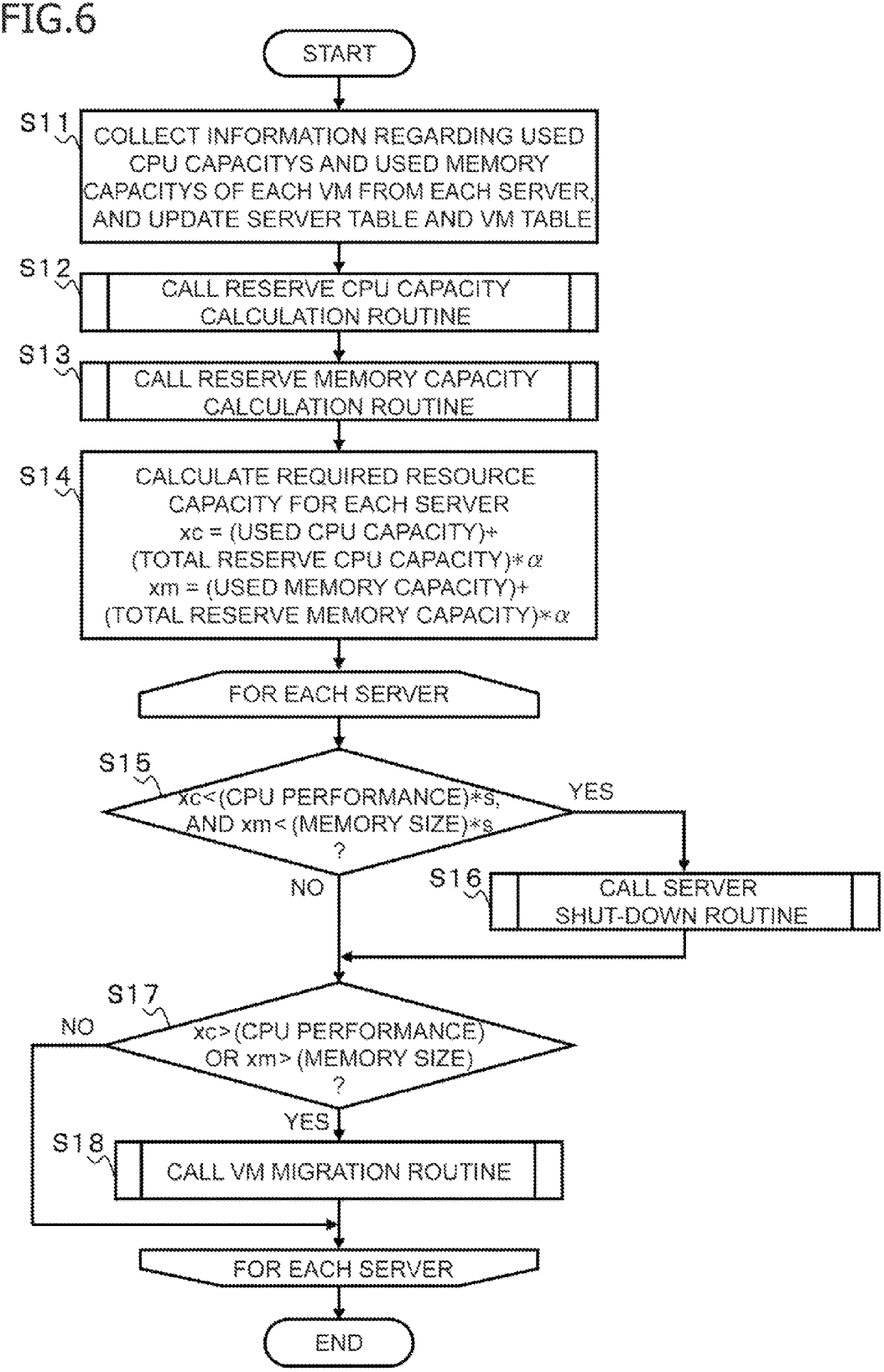
FIG. 6 is a flowchart illustrating one example of a VM re-arrangement process.

FIG. 6 is a flowchart illustrating a VM re-arrangement process. This process is performed, for example, at a predetermined time interval that is set in advance in the management server 10.

Since steps 11 to 14 are similar to steps 1 to 4 illustrated in FIG. 5, no further description will be given here.

Steps 15 to 18 described below are performed to each server 1 to 4.

In step 15, the arrangement control unit 11 determines whether or not the following conditions are satisfied: a total required CPU capacity of a server is less than the lower limit of an permitted available range of the total used CPU capacity of the server, and a total required memory capacity of the server is less than the lower limit of an permitted available range of the total used memory capacity of the server to be processed. The lower limit of the permitted available range of the total used CPU capacity and the lower limit of the permitted available range of the total used memory capacity of the server can be calculated, for example, according to the following equations.

Lower Limit of Total Used CPU Capacity=(CPU Performance)*$s$

Lower Limit of Total Used Memory Capacity= (Memory Size)*$s$

In the equations above, "s" is an activity ratio lower limit parameter that is set in the parameter 14A of the VM management DB 14.

If the total required CPU capacity is less than the lower limit of the permitted available range of the total used CPU capacity and the total required memory capacity is less than the lower limit of the permitted available range of the total used memory capacity, the processing proceeds to step 16 (Yes), while if otherwise, the processing proceeds to step 17 (No).

In step 16, the arrangement control unit 11 calls a server shut-down routine for the server.

In step 17, the arrangement control unit 11 determines whether or not at least one of the following conditions (1) and (2) is satisfied: (1) the total required CPU capacity of the server is greater than the CPU performance of the server to be processed; and (2) the total required memory capacity of the server is greater than the memory size of the server to be processed. If the total required CPU capacity is greater or the total required memory capacity of the server is greater, the processing proceeds to step 18 (Yes), while the total required CPU capacity is not greater and the total required memory capacity of the server is not greater, the processing is returned to step 15 in which the next server is started to be processed (No).

In step 18, the arrangement control unit 11 calls a VM migration routine.

Figure 7:
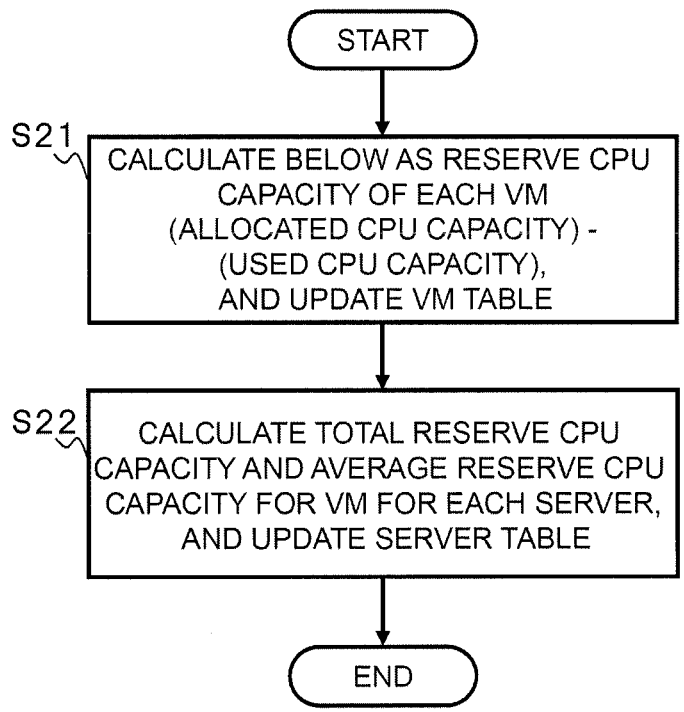
FIG. 7 is a flowchart illustrating one example of a reserve CPU capacity calculation routine (first embodiment)

FIG. 7 is a flowchart illustrating a process in a reserve CPU capacity calculation routine.

In step 21, the arrangement control unit 11 calculates a reserve CPU capacity for each of VMs running on each server 1 to 4. At this time, the reserve CPU capacity of each VM is calculated, for example, according to the following equation.

Reserve CPU Capacity for VM=(Allocated CPU Capacity to VM)−(Used CPU Capacity of VM)

Then, the arrangement control unit 11 updates the reserve CPU capacity for the VM table 14C to the calculated reserve CPU capacity for each VM.

In step 22, the arrangement control unit 11 calculates a total reserve CPU capacity and an average reserve CPU capacity for all of the VMs that operate on the same server, for each server, and updates the total reserve CPU capacity and the average reserve CPU capacity of the server table 14B to the calculated total reserve CPU capacity and the calculated average reserve CPU capacity.

Figure 8:
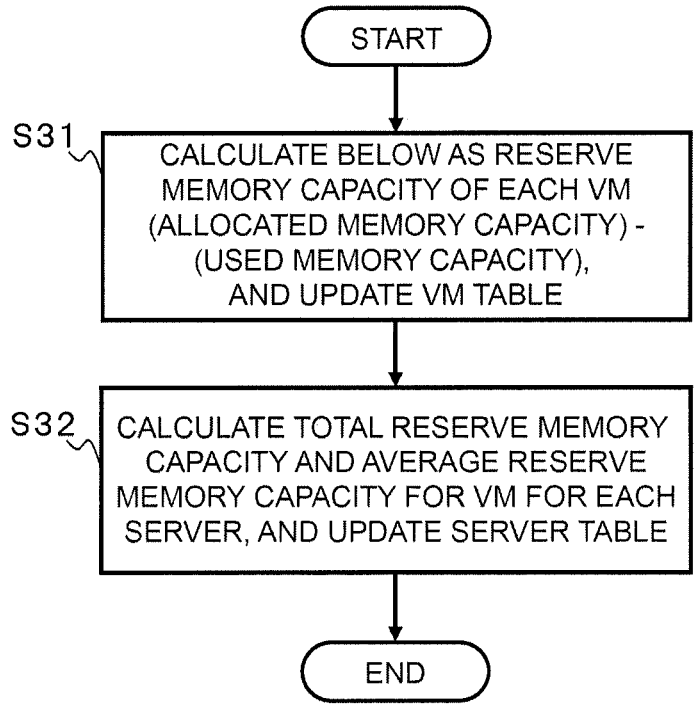
FIG. 8 is a flowchart illustrating one example of a reserve memory capacity calculation routine (first embodiment)

FIG. 8 is a flowchart illustrating a process in a reserve memory capacity calculation routine.

In step 31, the arrangement control unit 11 calculates a reserve memory capacity for each of VMs running on the respective servers 1 to 4. At this time, the reserve memory capacity of each VM is calculated, for example, according to the following equation.

Reserve Memory Capacity for VM=(Allocated Memory Capacity to VM)−(Used Memory Capacity of VM)

Then, the arrangement control unit 11 updates the reserve memory capacity of the VM table 14C to the calculated reserve memory capacity for each VM.

In step 32, the arrangement control unit 11 calculates a total reserve memory capacity and an average reserve memory capacity for all of the VMs that operate on the same server, for each server, and updates the total reserve memory capacity and the average reserve memory capacity of the server table 14B to the calculated total reserve memory capacity and the calculated average reserve memory capacity.

Figure 9:
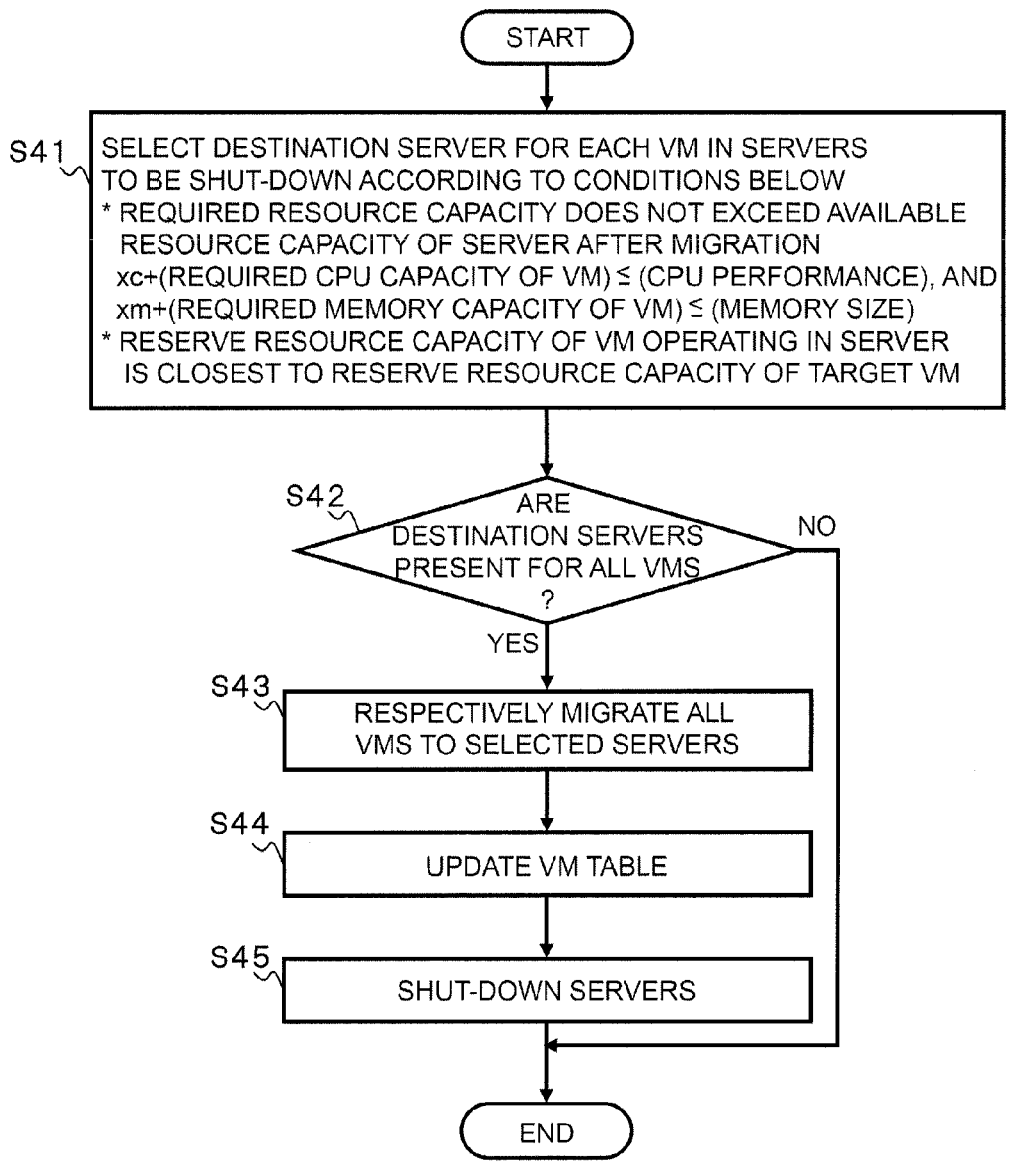
FIG. 9 is a flowchart illustrating one example of a server shut-down routine.

FIG. 9 is a flowchart illustrating a process in a server shut-down routine.

In step 41, the arrangement control unit 11 selects a server to which all of the VMs running on the server (i.e. the server to be shut down) are migrated. Here, as one example of a criteria for selecting a server, a server in which the required resource capacity is less than it's physical resource performance even after the target VMs to be migrated are migrated is selected as a destination server. As criteria for selecting a destination server as a destination, for example, a server which satisfies the following conditions is selected.

(Total Required CPU Capacity of Destination Server)+(Required CPU Capacity for Target VM to be Migrated)≤(is less than or equal to) (CPU Performance of Destination server); and (Total Required Memory Capacity of Destination Server)+(Required Memory Capacity for Target VM to be Migrated)≤(is less than or equal to) (Memory Size of Destination Server).

The required CPU capacity and the required memory capacity for the target VM to be migrated are calculated, for example, according to the following equations.

Required CPU Capacity=(Used CPU Capacity)+(Reserve CPU Capacity)*α

Required Memory Capacity=(Used Memory Capacity)+(Reserve Memory Capacity)*α

Selecting a server which satisfies the conditions above is equal to selecting a server having a free physical resource capacity which corresponds to a sum of the used physical resource capacity used by the target vertical machine to be migrated and the reserve physical resource capacity for the target vertical machine to be migrated.

Here, the arrangement control unit 11 further selects, among the servers that satisfy the criteria above, such a server in which a difference between the reserve physical resource capacity for a VM running thereon and the reserve physical resource capacity for the target VM to be migrated is smallest. In other words, the arrangement control unit 11 selects, among the servers that satisfy the criteria above, such a server having the reserve physical resource capacity for a VM running thereon that is closest to the reserve physical resource capacity for the target VM to be migrated. As one example of a method for selecting such a server, there is a method for selecting a server in which the average reserve physical resource capacity of VMs running thereon is closer to the reserve physical resource capacity for the target VM to be migrated. For example, a server in which the calculation result of the following formula is smallest is selected.

$$\left[\frac{(\text{Reserve CPU Capacity for } VM) - (\text{Average Reserve CPU Capacity})}{\text{Average CPU Performance of All Servers}}\right]^2 +$$

$$\left[\frac{(\text{Reserve Memory Capacity for } VM) - (\text{Average Reserve Memory Capacity})}{\text{Average Memory Size of All Servers}}\right]^2$$

In step 42, the arrangement control unit 11 determines whether or not all of the VMs running on a server can be migrated, i.e., whether or not a server which satisfies the criteria indicated in step 41 can be selected. If all of the VMs can be migrated, the processing proceeds to step 43 (Yes), while if a VM that cannot be migrated is present in these VMs, the processing is terminated.

In step 43, the VM control unit 12 migrates all the VMs running on the server to the destination server selected by the arrangement control unit 11 in step 41.

In step 44, the arrangement control unit 11 updates the VM table 14C of the VM management DB 14 by reflecting the VM migration performed in step 43. Specifically, the arrangement control unit 11 changes the name of the server associated with the migrated VMs from the server to the destination server.

In step 45, the power control unit 13 shuts down the server by turning off this server.

Figure 10:
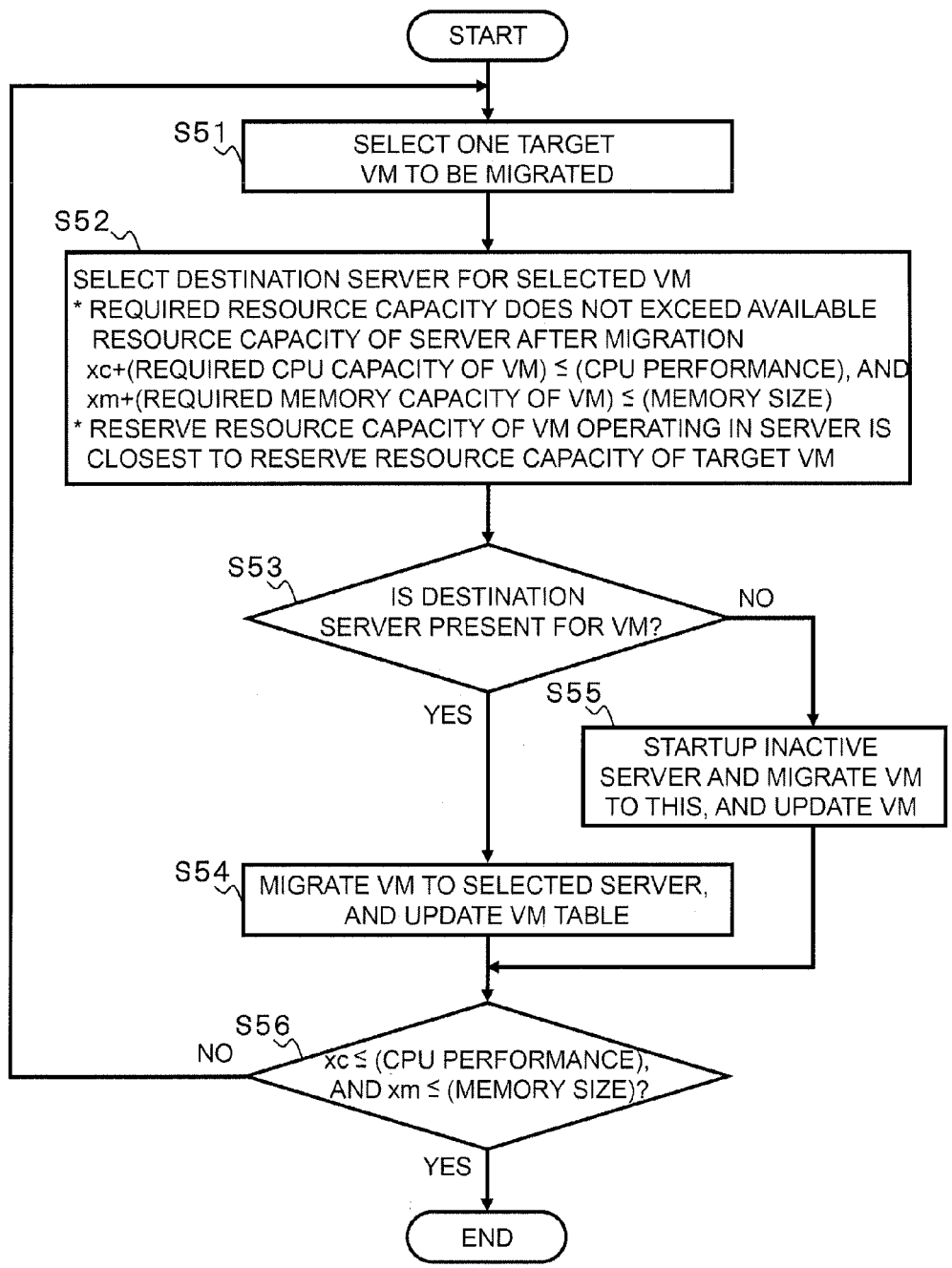
FIG. 10 is a flowchart illustrating one example of a VM migration routine.

FIG. 10 is a flowchart illustrating a process in a VM migration routine.

In step 51, the arrangement control unit 11 selects one of the VMs running on the server.

In step 52, the arrangement control unit 11 selects a server to which the VM selected in step 51 is migrated. For the selection criteria therefor, a criteria similar to that which is indicated in step 41 is used.

In step 53, the arrangement control unit 11 determines whether or not the VM selected in step 51 can be migrated, i.e., whether or not a server which satisfies the criteria indicated in step 41 can be selected. If the VM can be migrated, the processing proceeds to step 54 (Yes), while the VM cannot be migrated, the processing proceeds to step 55 (No).

In step 54, the arrangement control unit 11 migrates the VM to the selected server. Furthermore, the arrangement control unit 11 updates the VM table 14C of the VM management DB 14 by reflecting this VM migration. Specifically, the arrangement control unit 11 changes the name of the server associated with the migrated VM from the server to the destination server.

In step 55, the power control unit 13 turns on the power of an inactive server among the servers 1 to 4. Then, the arrangement control unit 11 migrates the VM to this activated server. Furthermore, the arrangement control unit 11 updates the VM table 14C of the VM management DB 14 by reflecting this VM migration. If no inactive server is present, the arrangement control unit 11 terminates this routine without migration of the VM.

In step 56, whether or not the following conditions (1) and (2) are satisfied is determined: (1) the total required CPU capacity is less than the CPU performance of the server; and (2) the total required memory capacity is less than the memory size of the server. If the total required CPU capacity is less than the CPU performance of the server and the total required memory capacity is less than the memory size of the server, this subroutine is terminated. If otherwise, the processing is returned to step 51 (No) in which a next VM is started to be processed.

In the following, a process when a server shutdown routine (FIG. 9) is called in the VM re-arrangement process (FIG. 6) will be described using a specific data example.

Regarding determination in step 15 for the VM re-arrangement process, in the specific data example in the server table 14B illustrated in FIG. 3, the total required CPU capacity of the server 1 is "0.6" which is less than the value obtained by multiplying the CPU performance "2.0" by the activity ratio lower limit value "0.5" in FIG. 2, i.e., is less than the lower limit value of the allowable range "1.0". Furthermore, the total required memory capacity is "0.4" which is less than the value obtained by multiplying the memory size "4.0" by the activity ratio lower limit value "0.5", i.e., is less than the lower limit value of the allowable range "2.0". Thus, the arrangement control unit 11 calls the server shut-down routine to turn off the power of the server 1.

At this time, the VM running on the server 1 is only VM1, as seen from the VM table 14C illustrated in FIG. 4. Then, the arrangement control unit 11 selects a server as a destination server for the VM1 according to the selection criteria indicated in step 41. Here, as described in the VM table 14C in FIG. 4, the reserve CPU capacity for the VM1 is "1.8" (i.e., the value obtained by subtracting the used CPU capacity "0.2" from the allocated CPU capacity "2.0"), and the reserve memory capacity for the VM1 is "0.8" (i.e., the value obtained by subtracting the used memory capacity "0.2" from the allocated memory capacity "1.0"). After that, referring to the server table 14B in FIG. 3, it is found that a server which satisfies the condition in step 41 above, in which a difference between its average reserve CPU capacity and the reserve CPU capacity "1.8" of the target VM to be migrate is smaller, and in which the difference between its average reserve memory capacity and the reserve memory capacity "0.2" of the target VM to be migrated is server 3. Accordingly, the arrangement control unit 11 selects the server 3 as a destination server to which the VM1 is migrated. Then, the VM control unit 12 migrates the VM1 to the server 3. The results obtained by updating the VM table 14C by reflecting the information on this migration is as disclosed in FIG. 11. In addition, the server table 14B to which a state in which the physical resource in each server is used is reflected after this migration is as disclosed in FIG. 12.

In the following, the process when the VM migration routine (FIG. 10) is performed in the VM re-arrangement process (FIG. 6) will be described using a specific data example.

In the specific data example in the server table 14B in FIG. 12, regarding the server 4, the total required CPU capacity "3.2" is greater than the CPU performance "3.0". Thus, the arrangement control unit 11 calls the VM migration routine based on the determination in step 17 of the VM re-arrangement process.

At this time, the VMs running on the server 4 are VM6 and VM7, as seen from the VM table 14C illustrated in FIG. 11. First, the arrangement control unit 11 selects the VM 6 as a VM to be migrated. Then, the arrangement control unit 11 selects a server as a destination server for the VM6 according to the selection criteria indicated in step 52. Referring to the server table 14B in FIG. 3, it is found that a server which satisfies the condition in step 41 above, in which its average reserve CPU capacity is closer to the reserve CPU capacity "1.8" for the VM6 to be migrated, and its average reserve memory capacity is closer to the reserve memory capacity "0.5" for the VM6 to be migrated is server 3. Accordingly, the arrangement control unit 11 selects the server 3 as a destination server to which the VM6 is migrated. Then, the VM control unit 12 migrates the VM6 to the server 3. Note that the VM table 14 C that is updated by reflecting the migration information above is as disclosed in FIG. 13. At this stage, the total required CPU capacity of the server 4 is "2.5" which is less than its CPU performance "3.0". Thus, the processing is terminated without migrating the VM7.

According to such a VM management system, among two or more servers, a server in which a required resource capacity for a target VM to be migrated can be reserved therein is selected as a destination server for the VM by performing the VM re-arrangement process. Thus, since a reserved capacity for the VM (i.e., a physical resource capacity expected to be further required for the VM to operate) is reserved, even if a load imposed by a VM operating in the server sharply increases, processing performance degradation of the VM due to shortage of physical resource can be avoided. Thus, without estimating or tuning a required resource capacity by a person, a resource can be appropriately reserved, and violation of SLA (Service Level Agreement) can be prevented.

In addition to the conditions above, a server having an average reserve physical resource capacity closer to the reserve physical resource capacity of the VM to be migrated is selected as a destination server of the VM. As a result, the VMs which respectively require reserve capacities closer to each other are collected to the same server, and a server in which a VM requires a larger reserve capacity and a server in which a VM requires a smaller reserve capacity are separated. In other words, virtual machines, in which their physical resource capacities further required when a load sharply increases are close to each other, are collected in the same server. Accordingly, only by reserving the minimum physical resource capacity, VMs can be efficiently consolidated in a server while reserving a reserve capacity for each of the VMs running on the server.

Figure 14A:
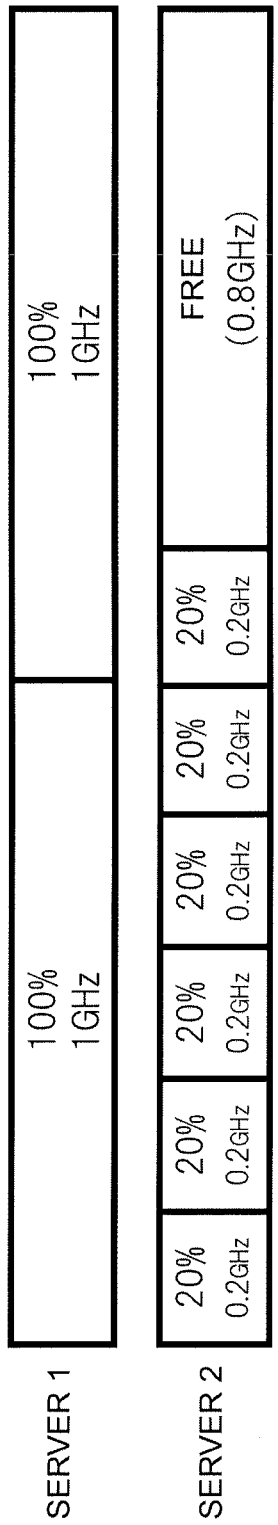
FIG. 14A is an explanatory view of one example of a VM arrangement in which VMs, respectively having reserve capacities which are close to each other, are consolidated in a single server.
Figure 14B:
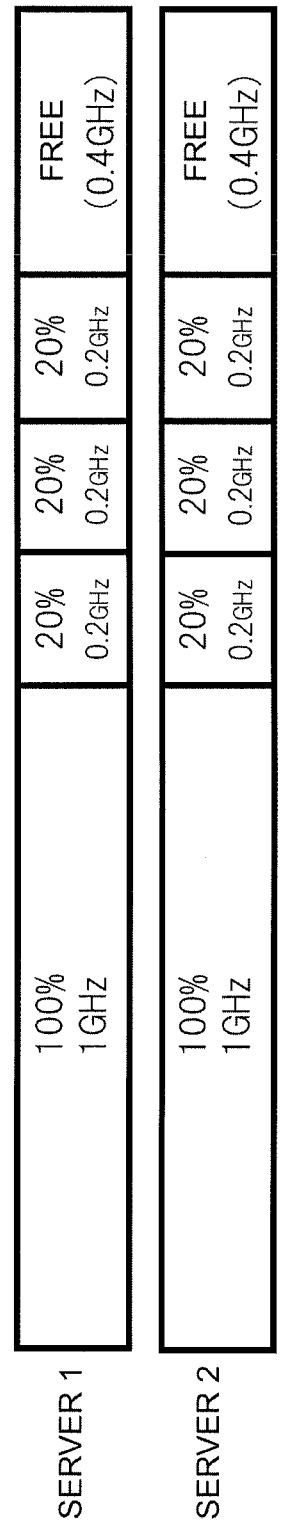
FIG. 14B is an explanatory view of one example of a VM arrangement in which VMs are consolidated in a single server regardless of their reserve capacities.

In the following, the advantageous effects above will be described using a specific example in reference to the drawings. To simplify the explanation, the description here is made focusing only a CPU use state. For example, FIG. 14A and FIG. 14B illustrate a case in which eight VMs each of which has an allocated CPU capacity of 1 GHz are arranged in two servers each having a CPU capacity of 2 GHz. Among these VMs, two VMs are VMs whose CPU activity ratio is 100% (i.e., the used CPU capacity is 1 GHz, and the reserve CPU capacity is 0 GHz), and six VMs are VMs whose CPU activity ratio is 20% (i.e., the used CPU capacity is 0.2 GHz, and the reserve CPU capacity is 0.8 GHz). In this case, according to the present VM management system, the VMs whose reserve capacities are close to each other are consolidated in the same server, so that the arrangement is as illustrated in FIG. 14A. The server 1 will not be subjected to shortage of physical resource, because the reserve capacity of each VM is zero (0) and no further CPU resource is required due to sharp increase of load. Regarding the server 2, even if the load of any VM temporarily sharply increases, so that its activity ratio becomes 100%, performance degradation of the VM can be prevented because a free space of 0.8 GHz is reserved. On the other hand, FIG. 14B illustrate one example when these VMs are consolidated in two servers without using the present VM management system. In such an arrangement in FIG. 14B, when the CPU activity ratio of any one of the VMs whose CPU activity ratio is 20% temporarily increases sharply, performance degradation due to shortage of physical resource may be caused when the CPU activity ratio exceeds 60%, because only a free space of 0.4 GHz is reserved in each of the server 1 and server 2. Thus, according to the present VM management system, the number of operating server can be reduced by efficiently consolidated VMs to the same server while reserving a physical resource to accommodate temporal sharp increase of the load of each VM, so that the costs such as for power consumption, etc., can be reduced.

Furthermore, according to the embodiment above, when the total required resource capacity for the VMs operating on the same server is less than the lower limit value of the used capacity of the server, these VMs are migrated to another server, and the server from which the VMs are migrated is shut down. As a result, the number of operating servers is further reduced, so that further cost reduction can be achieved.

In the server shut-down routine and the VM migration routine in the embodiment above, when selecting a destination server to which a VM is migrated (step 41 and step 52), a server in which the reserve capacity for the VM running thereon is closest to the reserve capacity for the target VM to be migrated, is selected. However, without limiting to the closest server, the VMs whose reserve capacities are close to each other may be consolidated in the same server, by preferentially selecting a server in which the reserve capacity of the VM operating thereon is closer to the reserve capacity for the VM to be migrated than other servers.

Furthermore when selecting a destination server to which the VM is migrated as described above, a destination server is selected on the condition of selecting a server in which the required resource capacity is less than the its physical resource performance even after the target VM to be migrated is migrated. However, even if there is a possibility that the required resource capacity of the server exceeds the physical resource performance of the server, a VM may be migrated to a server which satisfies the condition that the reserve capacity for the VM operating on the server is close to the reserve capacity for the target VM to be migrated. In this case, for example, the target VM to be migrated may be migrated, after reserving a physical resource capacity in the destination server by, among the VMs which have already operated on the destination server, migrating a VM, in which the difference between its reserve capacity and the reserve capacity for the target VM to be migrated is larger than that of the other VMs, to a further different server.

In addition, in the VM re-arrangement process of the embodiment above, only when the required resource capacity of a server is greater than the physical resource performance of the server (step 17), re-arrangement is performed by migrating a VM. As a result, a load of a server with a high probability of shortage of physical resource can be reduced, performance degradation can be prevented, and appropriate arrangement of VMs can be gradually made while suppressing the number of VM migrations, compared with a case of unconditionally performing re-arrangement. However, not limited thereto, the migration process may be performed so that the VMs whose reserve capacities are close to each other are arranged in the same server, for example, while monitoring at a predetermined time interval the reserve capacities of the VMs which are arranged in each server.

Furthermore, in the VM migration routine, when selecting a VM to be migrated (step 51), a VM which requires larger reserve capacity may be preferentially selected. As a result, VMs which require a larger reserve capacity, i.e., VMs with higher possibility of applying less load, are migrated in decreasing order to another server, so that the interference to the operation on the VM associated with the VM migration process can be avoided as much as possible. Furthermore, the setting parameter 14A and the activity ratio lower limit value (s) set for a CPU may be different from those set for a memory.

In the first embodiment above, the VM arrangement is controlled based on both a CPU use state and a memory use state. However, the VM arrangement may be controlled only based on a CPU use state. In the following, a difference of a modification in which the VM arrangement is controlled only based on a CPU use state from the first embodiment above will be described.

The server table 14B may contain only a server name, a power state of the server, and columns relating to a CPU, i.e., a CPU performance, a total used CPU capacity, a free CPU capacity, a total reserve CPU capacity, a total required CPU capacity, and an average reserve CPU capacity of the server. Similarly, the VM table 14C may contain only a VM name, of a VM, a server name on which the VM operates, an allocated CPU capacity to the VM, a used CPU capacity by the VM, a reserve CPU capacity for the VM, and a required CPU capacity of the VM.

Furthermore, in the VM new addition process (FIG. 5), in step 1, the arrangement control unit 11 collects information, from which the used CPU capacities by VMs running on each server, can be specified, from the servers 1 to 4. Then, the arrangement control unit 11 calculates a reserve CPU capacity in step 2, and calculates a total required CPU capacity for each server in step 4. Then, in step 5, a VM is arranged in a server with the smallest total required CPU capacity.

Furthermore, in the VM re-arrangement process (FIG. 6), in step 15, the arrangement control unit 11 determines whether or not a total required CPU capacity is less than the lower limit value of the used CPU capacity of the server. Furthermore, if the total required CPU capacity is less than the lower limit value of the used CPU capacity of the server, a subroutine for shutting down the server is called for the server, in step 16. Furthermore, in step 17, the arrangement control unit 11 determines whether or not the total required CPU capacity is greater than the CPU performance of the server. If the total required CPU capacity is greater than the CPU performance of the server, the arrangement control unit 11 calls the VM migration routing, in step 18.

Furthermore, in step 41 of the server shut-down routine (FIG. 9) and in step 52 of the VM migration routing (FIG. 10), only the CPU use state is used for the selection criteria for selecting a destination server for a VM. Specifically, a server which satisfies the following criteria may be selected:

(Total Required CPU Capacity of Destination Server)+(Required CPU Capacity of Target VM to be Migrated)≤(CPU Performance of Destination Server).

Among the servers that satisfy the criteria above, such a server that a difference between the reserve CPU capacity for a VM running thereon and the reserve CPU capacity for the target VM to be migrated is smallest, is selected. As one example of a method for selecting such a server is a method for selecting a server in which the average reserve CPU capacity of VMs running on the server is closer to the reserve CPU capacity for the target VM to be migrated.

Furthermore, similar to the modification in which the VM arrangement is controlled based on only the CPU use state, it is also possible to control the VM arrangement based on only the memory use state.

Second Embodiment

In the VM management system according to a second embodiment, a reserve CPU capacity and a reserve memory capacity are calculated, taking into consideration a past state in which a physical resource was used in a server. Note that a description on components similar to those of the first embodiment is omitted.

Figure 15:
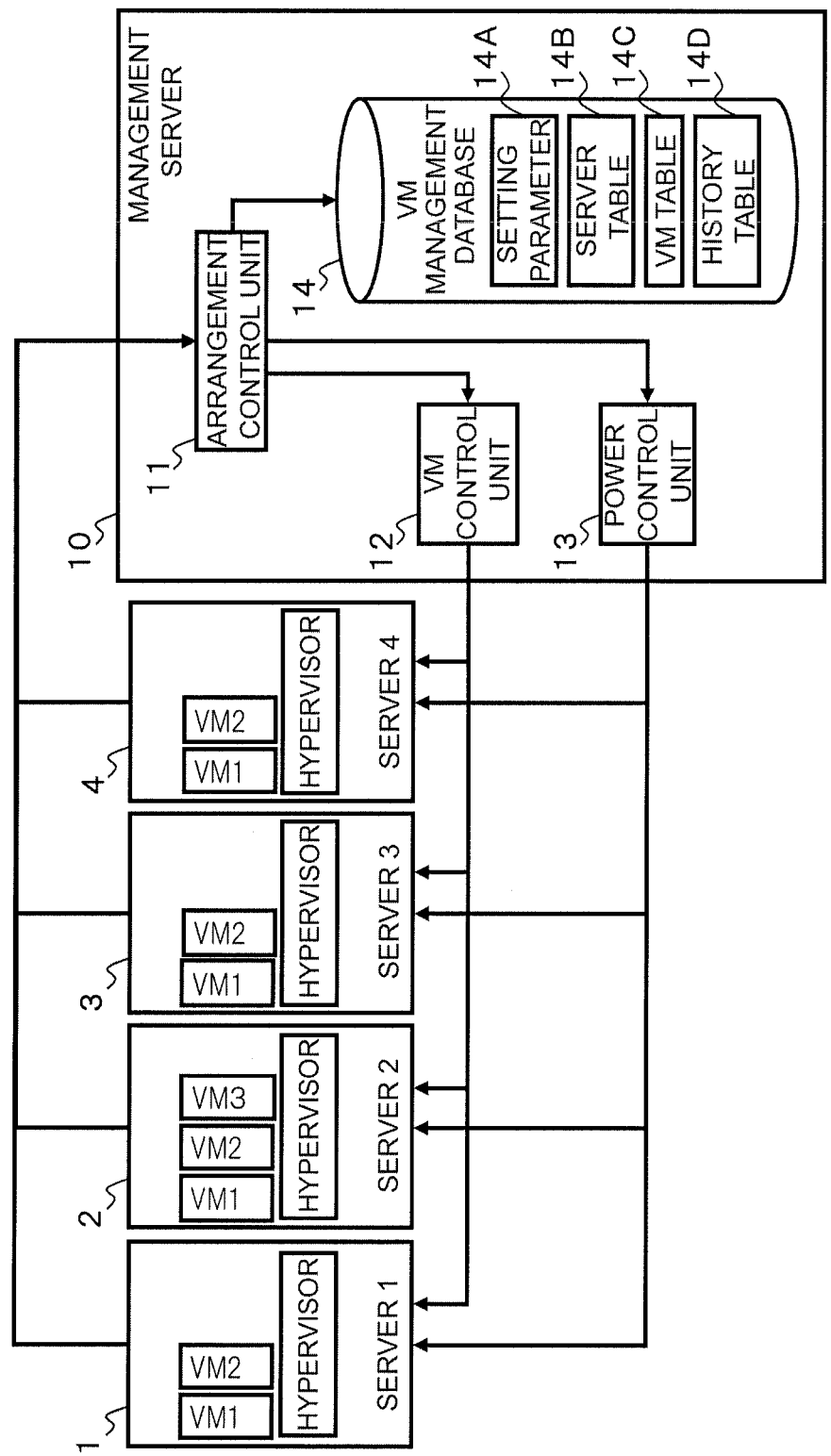
FIG. 15 illustrates a configuration view of one example of a VM management system (second embodiment)

FIG. 15 is a configuration view of a VM management system according to the second embodiment. In the second embodiment, a history table 14D in a VM management DB 14 is further added to the configuration view of the first embodiment above.

In the following, the data structure of the history table 14D in the VM management DB 14 of the second embodiment will be described. Since a setting parameter 14A, a server table 14B, and a VM table 14C are similar to those of the first embodiment, no further description will be given here.

The history table 14D is a table in which information indicating a history of the maximum values of used CPU capacities and a history of the maximum values of used memory capacities of each VM operating on the servers 1 to 4 in a past predetermined period is stored. Furthermore, as illustrated in FIG. 16, the history table 14D contains a VM name, the maximum used CPU capacity of the VM of each day during the last thirty (30) days including today, and the maximum used CPU capacity of the VM during the last 30 days. Furthermore, the history table 14D also contains the maximum used memory capacity of the VM of each day during the last 30 days including today, and the maximum used memory capacity of the VM during the last 30 days. The old information after a period (30 days) for maintaining such data in the history table 14D elapses is removed by the arrangement control unit 11. The period for maintaining such data in the history table 14D is not limited to 30 days, and may be optionally changed.

In the following, processes performed by the management server 10 will be described.

Since a VM new addition process (FIG. 5), a VM re-arrangement process (FIG. 6), a process in a server shut-down routine (FIG. 9), and a process in a VM migration routine (FIG. 10) are similar to those of the first example, no further description will be given here.

Figure 17:
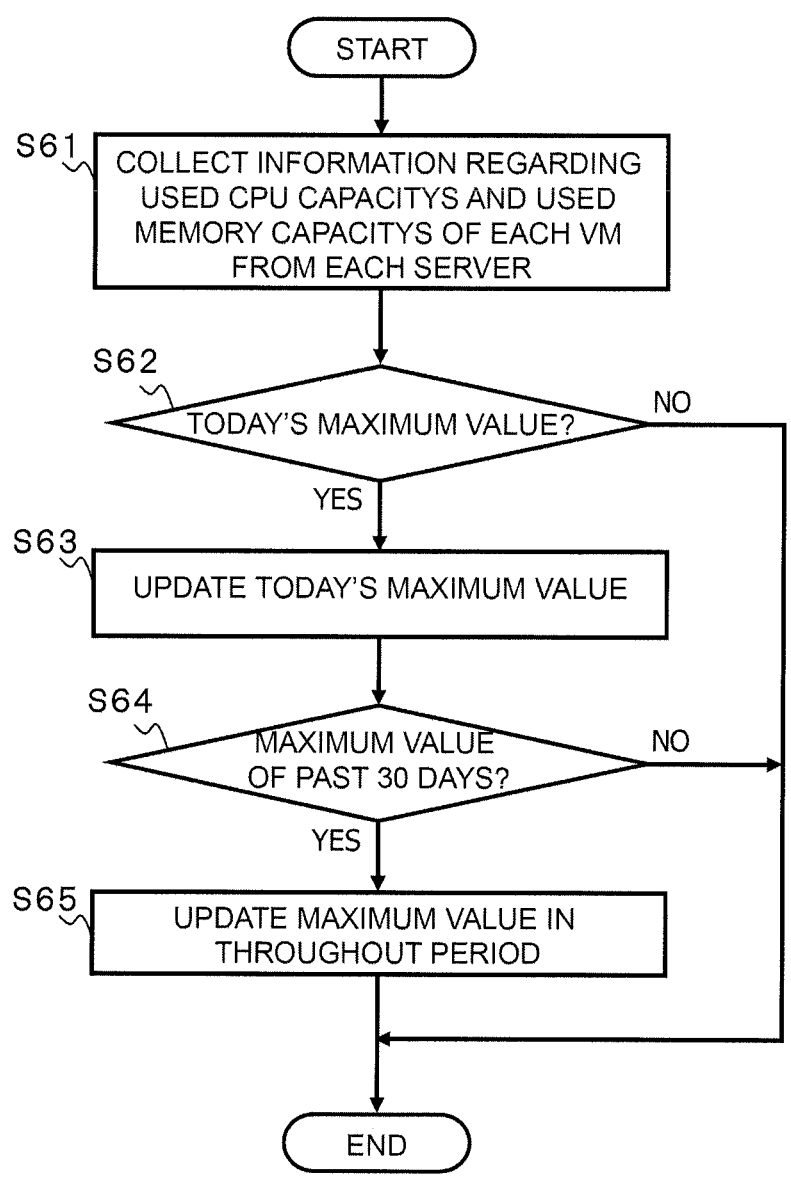
FIG. 17 is a flowchart illustrating one example of a history recording process.

FIG. 17 is a flowchart illustrating a history recording process. This process is performed, for example, at a predetermined time interval that is set in advance in the management server 10.

In step 61, the arrangement control unit 11 collects information, from which a used CPU capacity and a used memory capacity by each of VMs operating on each server can be specified, from servers 1 to 4.

In step 62, one or both of a used CPU capacity and a used memory capacity is/are greater than the today's maximum value recorded on the history table 14, the processing proceeds to step 63 (Yes), while both of the used CPU capacity and the used memory capacity are less than the today's maximum value, the history recording process is terminated (No).

In step 63, if the used CPU capacity is greater than the value of the today's maximum used CPU capacity in the history table 14D, the arrangement control unit 11 updates the value of the today's maximum used CPU capacity in the history table 14D to the used CPU capacities collected in step 61. Similarly, if the used memory capacity is greater than the value of the today's maximum used memory capacity in the history table 14D, the arrangement control unit 11 updates the value of the today's maximum used memory capacity in the history table 14D to the used memory capacities collected in step 61.

In step 64, one or both of a used CPU capacity and a used memory capacity is/are greater than the maximum values during the last 30 days, the processing proceeds to step 65

(Yes), while both of the used CPU capacity and the used memory capacity are less than the maximum values during the last 30 days, the history recording process is terminated (No).

In step 65, if the used CPU capacity is greater than the maximum used CPU capacities during the last 30 days in the history table 14D, the arrangement control unit 11 updates the maximum used CPU capacity through the last 30 days in the history table 14D to the used capacities collected in step 61. Similarly, if the used memory capacity is greater than the maximum used memory capacity through the last 30 days, the arrangement control unit 11 updates the maximum used memory capacity in the history table 14D to the used capacities collected in step 61.

Figure 18:
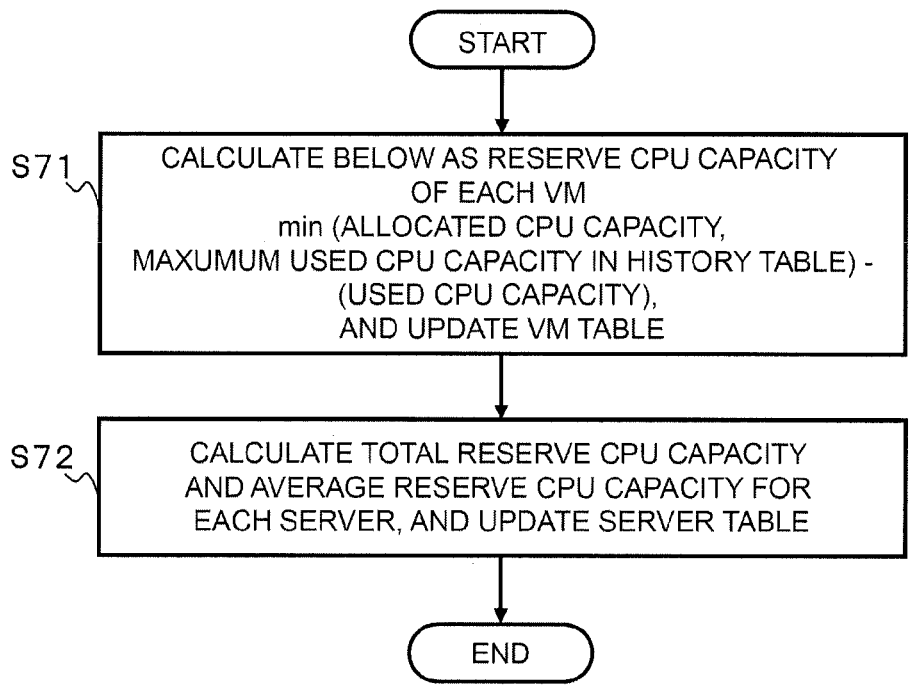
FIG. 18 is a flowchart illustrating one example of a reserve CPU capacity calculation routine (second embodiment)

FIG. 18 is a flowchart illustrating a process in a reserve CPU capacity calculation routine.

In step 71, the arrangement control unit 11 calculates the reserve CPU capacity for each VM operating on the server 1 to 4, taking into consideration the past used CPU capacities. Specifically, the arrangement control unit 11 calculates the reserve CPU capacity, for example, according to the following formula.

min(Allocated CPU Capacity, Maximum Used CPU Capacity in History Table 14D)−(Used CPU Capacity)

In other words, the reserve CPU capacity is calculated by subtracting the used CPU capacity from a value that is smaller between the allocated CPU capacity and the maximum used CPU capacity in the history table 14D. Then, the arrangement control unit 11 updates the reserve CPU capacity of the VM table 14C to the calculated reserve CPU capacity for each VM.

In step 72, the arrangement control unit 11 calculates for each server a total reserve CPU capacity and an average reserve CPU capacity for the VMs running on the servers 1 to 4, and updates the server table 14B.

Figure 19:
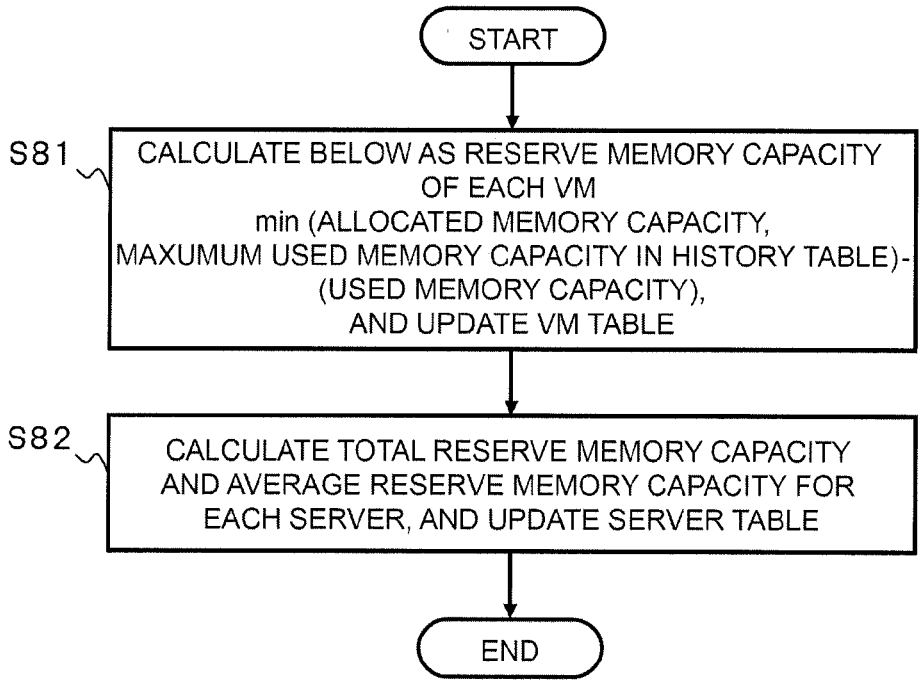
FIG. 19 is a flowchart illustrating one example of a reserve memory capacity calculation routine (second embodiment)

FIG. 19 is a flowchart illustrating a process in a reserve memory capacity calculation routine.

In step 81, the arrangement control unit 11 calculates the reserve memory capacity for each VM operating on the server 1 to 4, taking into consideration the past used memory capacities. Specifically, the arrangement control unit 11 calculates the reserve memory capacity, for example, according to the following formula.

min(Allocated Memory Capacity, Maximum Used Memory Capacity in History Table 14D)−(Used Memory Capacity)

In other words, the reserve memory capacity is calculated by subtracting the used memory capacity from a value that is smaller between the allocated memory capacity and the maximum used memory capacity in the history table 14D. Then, the arrangement control unit 11 updates the reserve memory capacity of the VM table 14C using the calculated reserve memory capacity for each VM.

In step 82, the arrangement control unit 11 calculates for each server a total reserve memory capacity and an average reserve memory capacity for the VMs operating on each server, and updates the server table 14B.

In the following, a reserve CPU calculation routine in the second embodiment above will be described using a specific data example.

When the arrangement control unit 11 calculates a reserve CPU capacity taking into consideration the maximum value in the history table 14D in FIG. 21, based on the allocated CPU capacity and the used CPU capacity in the VM table 14C in FIG. 20, the result is as follows. For example, regarding VM1, the allocated CPU capacity is "2.0", which is equal to the maximum used CPU capacity through the last 30 days in the history table 14D. Thus, the reserve CPU capacity calculated by the process in step 71 is "1.8", which is a value subtracting the used CPU capacity "0.2" from the value "2.0" which is the allocated CPU capacity or the maximum used CPU capacity through the last 30 days. On the other hand, regarding VM2, the allocated CPU capacity is "3.0" and the maximum used CPU capacity through the last 30 days in the history table 14D is "2.8", which is less than the allocated CPU capacity. Thus, the reserve CPU capacity calculated by the process in step 71 is "0.0", which is a value subtracting the used CPU capacity "2.8" from the value "2.8" which is the maximum used CPU capacity through the last 30 days.

With the process by the VM management system according to the second embodiment, the following advantageous effects are further provided, compared with the first embodiment. That is, since the reserve physical resource capacity is calculated taking into consideration a past physical resource use state, the reserve physical resource capacity so obtained is closer to the physical resource capacity which can be actually used by the VM. Thus, a VM arrangement is determined based on more accurate reserve capacity, so that more appropriate VM arrangement can be provided. For example, an actual physical resource capacity used by a VM may be less than an allocated physical resource capacity to the VM, according to the process performed by the VM. In such a case, if the reserve capacity is calculated based on the specific calculation example for calculating the reserve capacity above, when the maximum physical resource capacity actually used is less than the allocated physical resource capacity, the reserve capacity is obtained by subtracting the used physical resource capacity from the maximum physical resource capacity actually used. Thus, the matter that a physical resource capacity that is expected substantially not to be used is included in a reserve capacity can be avoided, and the matter that VMs are arranged with an unnecessary physical resource being reserved can be avoided.

Note that in the VM management system according to the second embodiment, as in the first embodiment, the VMs may be arranged taking into consideration of the CPU use state only or the memory use state only.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer-readable medium storing a management program when executed by a computer performs:

collecting amount information of a plurality of servers, the amount information being a physical resource amount currently used by virtual machines running on the servers;

calculating, for a target server, of the servers, a reserve amount of a physical resource required by a virtual machine running on the target server by obtaining the physical resource amount currently used by the virtual machine from the collected amount information and subtracting the obtained physical resource amount currently used by the virtual machine from a physical resource amount that is expected to be required for the virtual machine to run;

calculating, for the servers, an average of reserve amounts of a physical resource required by virtual machines running on a server of the servers; and selecting a target virtual machine running on the target server, and selecting a destination server, of the servers, different from the target server, the target virtual machine of the target server to be migrated to the destination server, wherein the destination server is selected based on a difference between the reserve amount of the physical resource required by the target virtual machine and the average of the reserve amounts of the physical resource required by the virtual machines running on the destination server, the difference being less than the difference between the reserve amount of the physical resource required by the target virtual machine and the average of the reserve amounts of the physical resource required by the virtual machines running on another server different from both the target server and the destination server.

2. The non-transitory computer-readable medium according to claim 1, wherein
the calculating process calculates for the virtual machine the reserve amount by subtracting the physical resource amount currently used by the virtual machine from a physical resource amount allocated by the server to the virtual machine.

3. The non-transitory computer-readable medium according to claim 1, wherein
the calculating process calculates, for the servers, a reserve amount of a physical resource required by a virtual machine running on a server of the servers; and
the selecting process selects the destination server based on a difference between the reserve amount of the physical resource required by the target virtual machine and the reserve amount of the physical resource required by the virtual machine running on the destination server, the difference being less than a difference between the reserve amount of the physical resource required by the target virtual machine and the reserve resource amount of the physical resource required by the virtual machine running on another server different from both the target server and the destination server.

4. The non-transitory computer-readable medium according to claim 1, further comprising:
recording a history of the physical resource amount used by the virtual machines running on the servers.

5. The non-transitory computer-readable medium according to claim 4, wherein
the calculating process determines a maximum physical resource amount used by virtual machines within a predetermined past period among the used physical resource amounts recorded in the history, and calculates the reserve amount of the virtual machine by subtracting the physical resource amount currently used by the virtual machine from a physical resource amount allocated to the virtual machine, when the maximum used amount matches the physical resource amount allocated to the virtual machine, and calculates the reserve amount of the virtual machine by subtracting the physical resource amount currently used by the virtual machine from the maximum used amount when the maximum used amount is less than the physical resource amount allocated to the virtual machine.

6. The non-transitory computer-readable medium according to claim 1, wherein
the calculating process calculates a required resource amount of the server by summing up physical resources and all or a portion of reserve amounts of virtual machines running on the server, and
the selecting process, when the required resource amount of any of the servers is greater than total physical resource amount of the server, selects at least one of the virtual machines running on the server as the target virtual machine.

7. The non-transitory computer-readable medium according to claim 1, wherein
the calculating process calculates a required resource amount for the server by summing up physical resources and all or a portion of reserve amounts of virtual machines running on the server,
the selecting process, when the resource amount used by the virtual machines running on any single server among the servers is less than a lower limit of a permitted available range of a physical resource amount that is set in the server in advance, selects any of the virtual machines running on the server as the target virtual machine.

8. The non-transitory computer-readable medium according to claim 1, wherein physical resources comprise one or both of a CPU or a memory.

9. The non-transitory computer-readable medium according to claim 1, further comprising:
migrating the target virtual machine to the destination server.

10. A method of management for a computer, the method comprising:
executing by the computer:
collection means for collecting amount information of a plurality of servers, the amount information being a physical resource amount currently used by virtual machines running on the servers;
calculation means for calculating, for a target server, of the servers, a reserve amount of a physical resource required by a virtual machine running on the target server by obtaining the physical resource amount currently used by the virtual machine from the collected amount information and subtracting the obtained physical resource amount currently used by the virtual machine from a physical resource amount that is expected to be required for the virtual machine to run;
calculating, for the servers, an average of reserve amounts of a physical resource required by virtual machines running on a server of the servers; and
selection means for selecting a target virtual machine running on the target server, and selecting a destination server, of the servers, different from the target server, the target virtual machine of the target server to be migrated to the destination server,
wherein the destination server is selected based on a difference between the reserve amount of the physical resource required by the target virtual machine and the average of the reserve amounts of the physical resource required by the virtual machines running on the destination server, the difference being less than the difference between the reserve amount of the physical resource required by the target virtual machine and the average of the reserve amounts of the physical resource required by the virtual machines running on another server different from both the target server and the destination server.

11. A virtual machine management apparatus, the management apparatus comprising
a processor to:
collect amount information of a plurality of servers, the amount information being a physical resource amount currently used by virtual machines running on the servers;
calculate, for a target server, of the servers, a reserve amount of a physical resource required by a virtual machine running on the target server by obtaining the physical resource amount currently used by the virtual machine from the collected amount information and subtracting the obtained physical resource amount currently used by the virtual machine from a physical resource amount that is expected to be required for the virtual machine to run;
calculate, for the servers, an average of reserve amounts of a physical resource required by virtual machines running on a server of the servers; and
select a target virtual machine running on the target server and select a destination server, of the servers, different from the target server, the target virtual machine of the target server to be migrated to the destination server,
wherein the destination server is selected based on a difference between the reserve amount of the physical resource required by the target virtual machine and the average of the reserve amounts of the physical resource required by the virtual machines running on the destination server, the difference being less than the difference between the reserve amount of the physical resource required by the target virtual machine and the average of the reserve amounts of the physical resource required by the virtual machines running on another server different from both the target server and the destination server.

12. A non-transitory computer-readable medium storing a management program when executed by a computer performs:
collecting amount information of a plurality of servers, the amount information being a physical resource amount currently used by virtual machines running on the servers, and recording a history of the physical resource amount used by the virtual machines running on the servers;
calculating, for the servers, a reserve amount of a physical resource required by a virtual machine running on a server of the servers by obtaining the physical resource amount currently used by the virtual machine from the collected amount information, determining a maximum physical resource amount used by virtual machines within a predetermined past period among the used physical resource amounts recorded in the history and subtracting the physical resource amount currently used by the virtual machine from a physical resource amount allocated to the virtual machine, when the maximum used amount matches the physical resource amount allocated to the virtual machine, or subtracting the physical resource amount currently used by the virtual machine from the maximum used amount when the maximum used amount is less than the physical resource amount allocated to the virtual machine; and
selecting a target virtual machine running on a target server from among the servers, and selecting a destination server different from the target server, the target virtual machine of the target server to be migrated to the destination server,
wherein the destination server is selected based on a difference between the reserve amount of the physical resource required by the target virtual machine and the reserve amount of the physical resource required by the virtual machine running on the destination server, the difference being less than a difference between the reserve amount of the physical resource required by the target virtual machine and the reserve resource amount of the physical resource required by the virtual machine running on another server different from both the target server and the destination server.

13. A method of management for a computer, the method comprising:
executing by the computer:
collecting amount information of a plurality of servers, the amount information being a physical resource amount currently used by virtual machines running on the servers, and recording a history of the physical resource amount used by the virtual machines running on the servers;
calculating, for the servers, a reserve amount of a physical resource required by a virtual machine running on a server of the servers by obtaining the physical resource amount currently used by the virtual machine from the collected amount information, determining a maximum physical resource amount used by virtual machines within a predetermined past period among the used physical resource amounts recorded in the history and subtracting the physical resource amount currently used by the virtual machine from a physical resource amount allocated to the virtual machine, when the maximum used amount matches the physical resource amount allocated to the virtual machine, or subtracting the physical resource amount currently used by the virtual machine from the maximum used amount when the maximum used amount is less than the physical resource amount allocated to the virtual machine; and
selecting a target virtual machine running on a target server from among the servers, and selecting a destination server different from the target server, the target virtual machine of the target server to be migrated to the destination server,
wherein the destination server is selected based on a difference between the reserve amount of the physical resource required by the target virtual machine and the reserve amount of the physical resource required by the virtual machine running on the destination server, the difference being less than a difference between the reserve amount of the physical resource required by the target virtual machine and the reserve resource amount of the physical resource required by the virtual machine running on another server different from both the target server and the destination server.

14. A virtual machine management apparatus, the management apparatus comprising
a processor to:
collect amount information of a plurality of servers, the amount information being a physical resource amount currently used by virtual machines running on the servers, and record a history of the physical resource amount used by the virtual machines running on the servers;

calculate, for the servers, a reserve amount of a physical resource required by a virtual machine running on a server of the servers by obtaining the physical resource amount currently used by the virtual machine from the collected amount information, determining a maximum physical resource amount used by virtual machines within a predetermined past period among the used physical resource amounts recorded in the history and subtracting the physical resource amount currently used by the virtual machine from a physical resource amount allocated to the virtual machine, when the maximum used amount matches the physical resource amount allocated to the virtual machine, or subtracting the physical resource amount currently used by the virtual machine from the maximum used amount when the maximum used amount is less than the physical resource amount allocated to the virtual machine; and select a target virtual machine running on a target server from among the servers and select a destination server different from the target server, the target virtual machine of the target server to be migrated to the destination server, wherein the destination server is selected based on a difference between the reserve amount of the physical resource required by the target virtual machine and the reserve amount of the physical resource required by the virtual machine running on the destination server, the difference being less than a difference between the reserve amount of the physical resource required by the target virtual machine and the reserve resource amount of the physical resource required by the virtual machine running on another server different from both the target server and the destination server.

* * * * *